United States Patent
Smith et al.

(10) Patent No.: US 8,418,223 B1
(45) Date of Patent: Apr. 9, 2013

(54) SYSTEMS AND METHODS FOR UPDATING PARENTAL-CONTROL SETTINGS

(75) Inventors: Spencer Smith, El Segundo, CA (US); Adam Glick, Culver City, CA (US); Nicholas Graf, Culver City, CA (US)

(73) Assignee: Symantec Corporation, Mountain View, CA (US)

( * ) Notice: Subject to any disclaimer, the term of this patent is extended or adjusted under 35 U.S.C. 154(b) by 317 days.

(21) Appl. No.: 12/838,938

(22) Filed: Jul. 19, 2010

(51) Int. Cl.
*G06F 17/00* (2006.01)
*G06F 15/16* (2006.01)

(52) U.S. Cl.
USPC ............ 726/1; 726/2; 726/3; 726/4; 726/6; 726/26; 726/27; 726/28; 713/1; 713/100; 434/118; 434/365

(58) Field of Classification Search ............ 726/1, 28, 726/4
See application file for complete search history.

(56) References Cited

U.S. PATENT DOCUMENTS

| | | | |
|---|---|---|---|
| 2002/0178038 A1* | 11/2002 | Grybas | 705/7 |
| 2004/0083229 A1* | 4/2004 | Porter | 707/103 Y |
| 2006/0127870 A1* | 6/2006 | Fields et al. | 434/350 |
| 2009/0254656 A1* | 10/2009 | Vignisson et al. | 709/224 |
| 2009/0282009 A1* | 11/2009 | Levey et al. | 707/4 |
| 2010/0120008 A1* | 5/2010 | McDonagh et al. | 434/323 |
| 2010/0262459 A1* | 10/2010 | Akian et al. | 705/10 |
| 2010/0285871 A1* | 11/2010 | Shah et al. | 463/29 |
| 2011/0004946 A1* | 1/2011 | Lee et al. | 726/30 |
| 2011/0153754 A1* | 6/2011 | Gunasekara | 709/206 |

OTHER PUBLICATIONS

Aeries Student Information System: Lightspeed Systems and Aeries Bring One of a Kind Information to parents: http://www.Aeries.com/news.asp; Eagle Software; Dec. 3, 2008.
Pearson—PowerSchool; http://www.pearsonschoolsystems.com/products/powerschool/; Taken from site May 24, 2010.

* cited by examiner

*Primary Examiner* — Edan Orgad
*Assistant Examiner* — Jenise Jackson
(74) *Attorney, Agent, or Firm* — ALG Intellectual Property, LLC

(57) ABSTRACT

A computer-implemented method may include establishing, within a parental-control software system, an academic-performance policy that defines how academic performance of a student affects at least one parental-control setting enforced on a computing system accessible to the student. The computer-implemented method may also include receiving, via an electronic communication from a school of the student, grade information that indicates the student's academic performance. The computer-implemented method may further include applying the academic-performance policy by updating the parental-control setting commensurate with the student's academic performance. In addition, the computer-implemented method may include detecting an attempt by the student to access a resource of the computing system and applying the updated parental-control setting to control the student's access to the resource of the computing system.

20 Claims, 6 Drawing Sheets

SYSTEMS AND METHODS FOR UPDATING PARENTAL-CONTROL SETTINGS

BACKGROUND

An increasing number of schools are utilizing the Internet to inform parents of their children's grades and academic performance. For example, a school website may provide grade information that indicates the grades and academic performance of students attending a particular high school. Since the Internet is generally capable of disseminating information in such a convenient manner, teachers and/or administrators may choose to update students' grade information quite frequently, even on a daily basis.

However, due to life's various demands, parents may struggle to stay up-to-date on their children's progress at school. As a result, students' academic successes and/or failures may, at least temporarily, go unnoticed by their parents. Thus, parents may struggle to consistently implement incentives and restrictions for a child that are associated with the child's performance at school. For example, a parent may want to limit the amount of time a student spends playing computer games if the student is performing poorly at school, but the parent may not be able to continually keep up with the student's school performance and may not have the time to monitor the student's gaming activities. What is needed, therefore, is a mechanism for automatically updating computer-related activities of a student based on the student's academic performance.

SUMMARY

As will be described in greater detail below, the instant disclosure generally relates to systems and methods for updating parental-control settings. As such, the systems and methods disclosed herein may enable parents to configure a mechanism that automatically grants and/or revokes the computing privileges of their children based on their children's academic performance.

In certain embodiments, a method for calibrating parental-control settings commensurate with a student's academic performance may include establishing, within a parental-control software system, an academic-performance policy that defines how academic performance of a student affects at least one parental-control setting enforced on a computing system accessible to the student. For example, a policy module may receive, from a parent of a student, information used to establish an academic-performance policy that defines how the student's academic performance affects a parental-control setting that controls Internet access on the student's home computer. The academic-performance policy may take into account the student's grades, classroom behavior, attendance, participation, progress, and/or any other suitable indicator of the student's academic performance.

The academic-performance policy may define a threshold level that the student's academic performance must reach for the student to be allowed access to a particular resource of the computing system (e.g., the Internet, a webpage, a software application, a video game, an email account, an instant messaging client, a text messaging application, a phone application, a video application, etc.). For example, the academic-performance policy may indicate that the student must maintain a grade of "C" or above in math to be allowed Internet access on the student's home computer. The academic-performance policy may also define how the student's academic performance affects an amount of time that the student is allowed to access the resource of the computing system. For example, the academic-performance policy may indicate that the student must maintain an "A" in math to be allowed up to 2 hour of Internet access per day, a "B" in math to be allowed up to 1 hour of Internet access per day, or a "C" in math to be allowed up to 30 minutes of Internet access per day.

In some embodiments, an acquisition module may receive, via an electronic communication from a school of the student, grade information that indicates the student's academic performance. For example, the acquisition module may receive grade information indicating, among other things, that the student is currently maintaining an "A" in math. The grade information may indicate the student's academic performance based on the student's grades, classroom behavior, attendance, participation, progress, and/or any other indicator of the student's academic performance.

In some embodiments, the electronic communication from the student's school may be sent directly from the school to the parental-control software system on the computing system. In other embodiments, the electronic communication from the school of the student may be a school website that publishes the grade information. The acquisition module may retrieve the grade information from the website in order to enable the parental-control software system to analyze the student's academic performance. For example, the acquisition module may implement a screen-scraping technique to retrieve grade information displayed on the school's website.

The acquisition module may also determine, prior to retrieving the grade information from the website, that the parental-control software system has yet to receive the most up-to-date grade information available on the website. For example, prior to retrieving the grade information from the website, the acquisition module may query the website to determine that the website contains grade information that has not been received by the parental-control software system. In another example, prior to retrieving the grade information from the website, the acquisition module may receive an electronic communication indicating that the website contains updated grade information. The acquisition module may retrieve the grade information from the website in response to learning that the parental-control software system has yet to receive the most up-to-date grade information available on the website.

After the grade information has been received from the school of the student, a calibration module may apply the academic-performance policy by updating the parental-control setting commensurate with the student's academic performance. The calibration module may automatically update the parental-control setting when the parental-control software system receives the grade information from the school of the student. For example, after the parental-control software system receives the grade information indicating that the student is currently maintaining an "A" in math, the calibration module may automatically update the parental-control setting to allow the student up to 2 hours of Internet access per day.

More specifically, upon reception of the grade information, the calibration module may immediately analyze the student's academic performance in order to update the parental-control setting in real-time. The calibration module may analyze the student's academic performance by comparing the student's academic performance with the academic-performance policy. The calibration module may then determine, based on this comparison, whether the academic-performance policy requires the parental-control setting to be immediately modified due to the student's academic performance. For example, the calibration module may compare the student's academic performance with the academic-performance policy and then determine that, since the student is currently maintaining an "A" in math, the academic-performance policy requires the parental-control setting to be immediately modified in order to allow the student up to 3 hours of Internet access per day.

In some embodiments, an enforcement module may detect an attempt by the student to access the resource of the computing system. The enforcement module may then apply the updated parental-control setting to control the student's access to the resource of the computing system. For example, if the student has already accessed the Internet for 2 hours on a particular day, the enforcement module may determine that the student is no longer allowed to access the Internet because the parental-control setting limits the student's Internet access to 2 hours per day. In this example, the enforcement module may then block the student from accessing the Internet based on the updated parental-control setting. The enforcement module may also provide an electronic notification configured to inform the student that the parental-control setting has been automatically updated commensurate with the student's academic performance.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
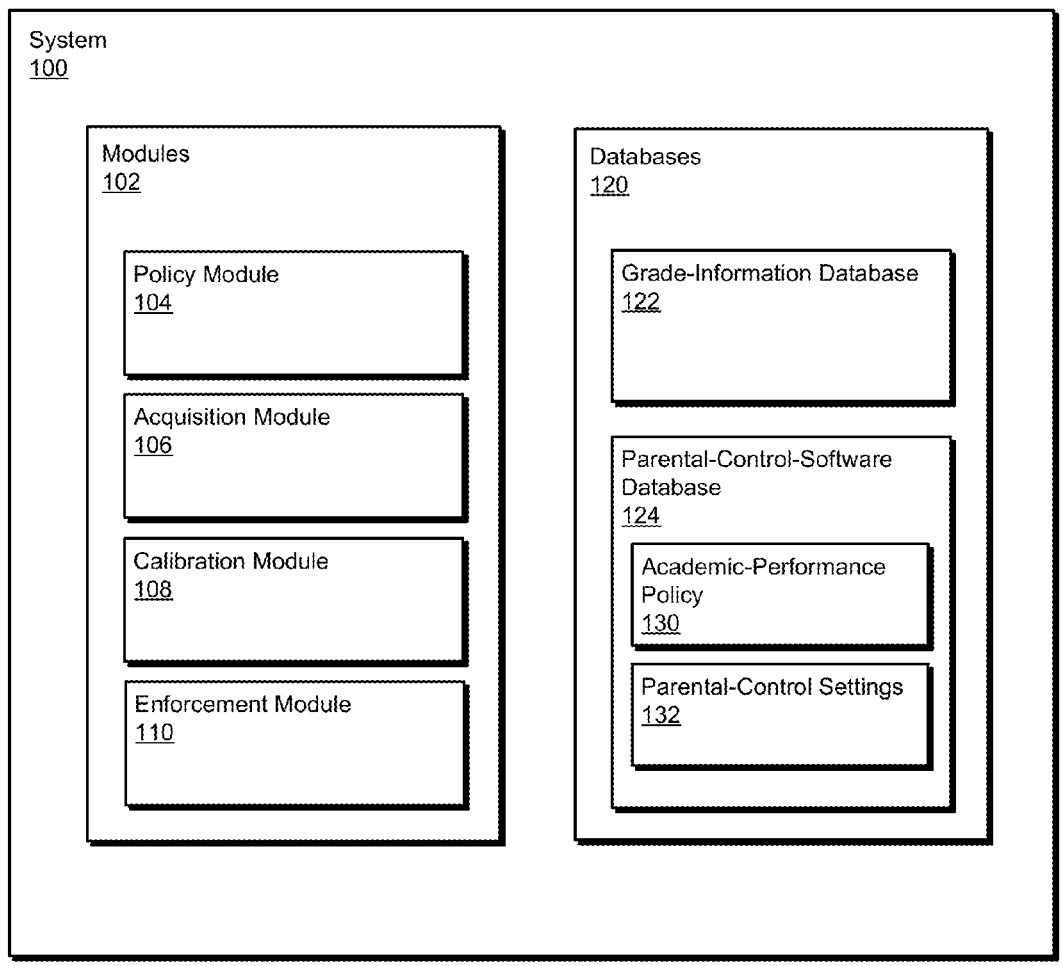
FIG. 1 is a block diagram of an exemplary system for updating parental-control settings.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for updating parental-control settings. As such, the systems and methods disclosed herein may enable parents to configure a mechanism that automatically grants and/or revokes the computing privileges of their children based on their children's academic performance. The terms "students" and "children" may be used interchangeably throughout the instant disclosure.

Figure 2:
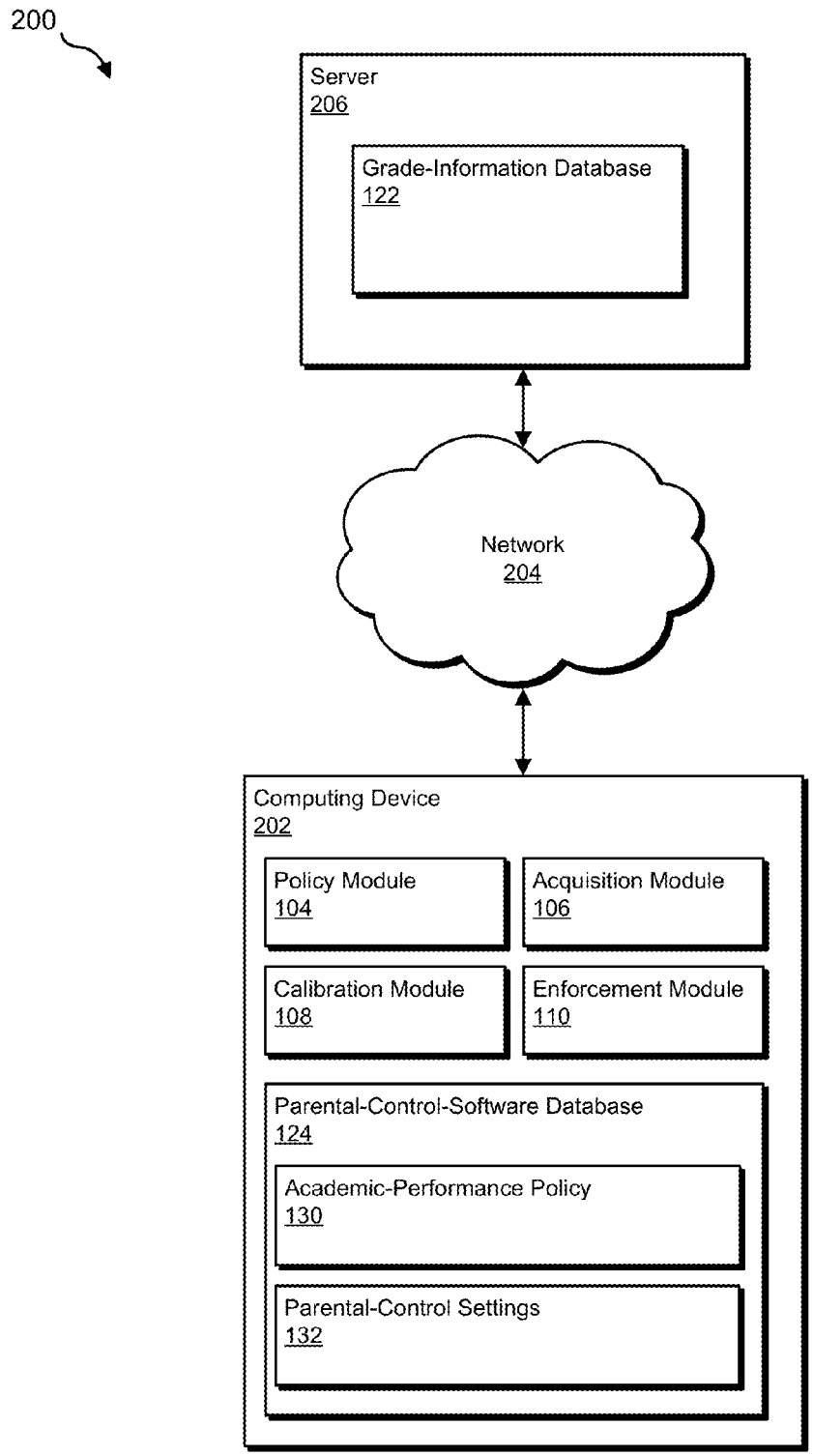
FIG. 2 is a block diagram of another exemplary system for updating parental-control settings.
Figure 3:
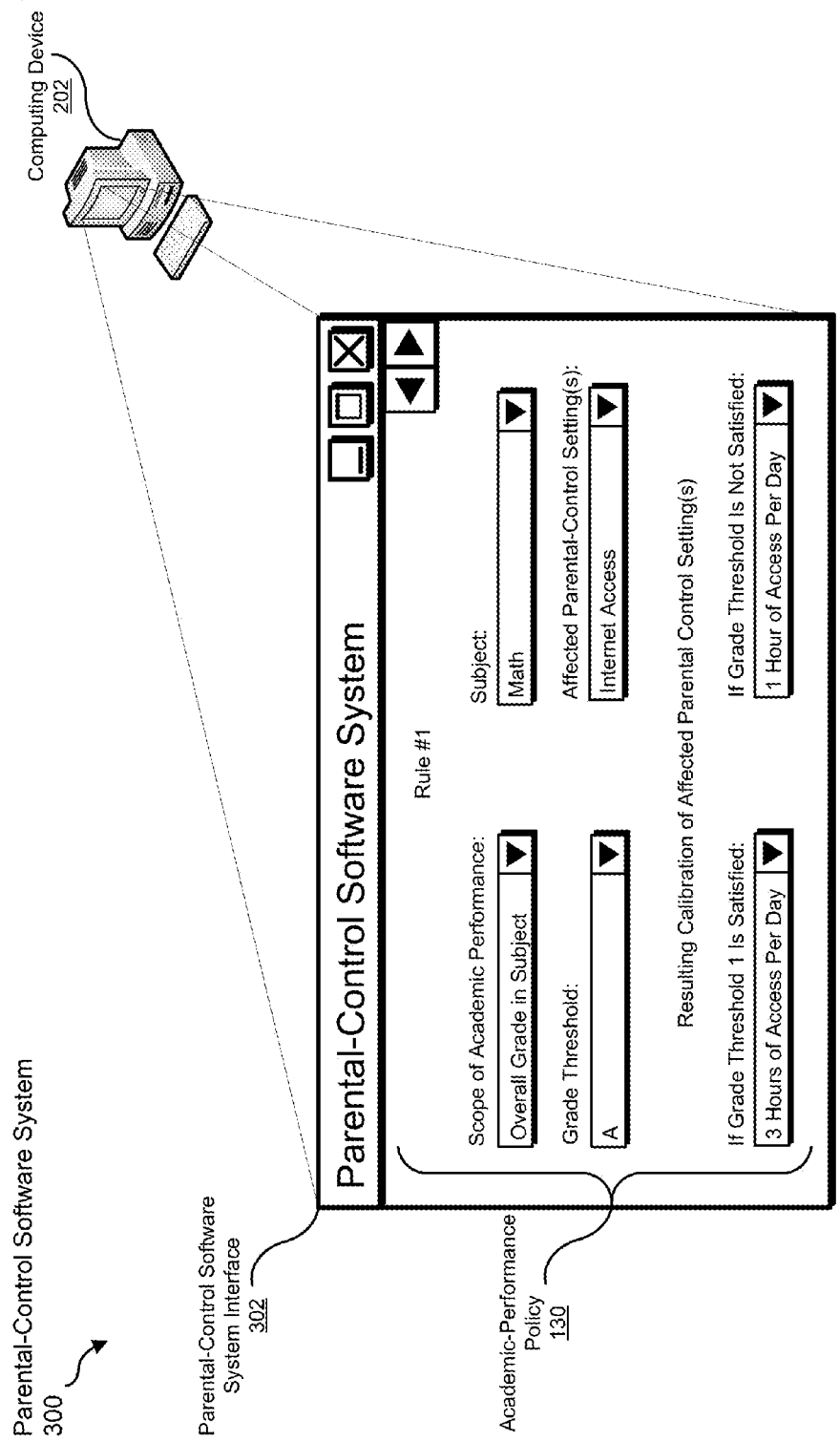
FIG. 3 is a block diagram of an exemplary parental-control software system for calibrating parental-control settings commensurate with a student's academic performance.

The following will provide, with reference to FIGS. 1-3, detailed descriptions of exemplary systems for updating parental-control settings. Detailed descriptions of corresponding computer-implemented methods will also be provided in connection with FIG. 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for updating parental-control settings. As illustrated in this figure, exemplary system 100 may include one or more modules 102 for performing one or more tasks. For example, and as will be explained in greater detail below, exemplary system 100 may include a policy module 104 programmed to establish, within a parental-control software system, an academic-performance policy that defines how academic performance of a student affects at least one parental-control setting enforced on a computing system accessible to the student. Exemplary system 100 may also include an acquisition module 106 programmed to receive, via an electronic communication from a school of the student, grade information that indicates the student's academic performance.

In addition, and as will be described in greater detail below, exemplary system 100 may include a calibration module 108 programmed to apply the academic-performance policy by updating the parental-control setting commensurate with the student's academic performance. Exemplary system 100 may further include an enforcement module 110 programmed to detect an attempt by the student to access a resource of the computing system and then apply the updated parental-control setting to control the student's access to the resource of the computing device. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing device 202 and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases 120. Databases 120 may represent portions of a single database or computing device or a plurality of databases or computing devices. In one embodiment, exemplary system 100 may include a grade-information database 122 configured to store grade information that indicates a student's academic performance. Exemplary system 100 may also include a parental-control-software database 124 configured to store an academic-performance policy 130 and parental-control settings 132.

Databases 120 in FIG. 1 may represent a portion of one or more computing devices. For example, databases 120 may represent a portion of server 206 in FIG. 2, computing system 510 in FIG. 5, and/or portions of exemplary network architecture 600 in FIG. 6. Alternatively, databases 120 in FIG. 1 may represent one or more physically separate devices capable of being accessed by a computing device, such as server 206 in FIG. 2, computing system 510 in FIG. 5, and/or portions of exemplary network architecture 600 in FIG. 6.

Exemplary system 100 in FIG. 1 may be deployed in a variety of ways. For example, all or a portion of exemplary system 100 may represent portions of exemplary computing system 200 in FIG. 2. As shown in FIG. 2, computing system 200 may include a computing device 202 in communication with a server 206 via a network 204. In one embodiment, and as will be described in greater detail below, computing device 202 may be programmed to establish, within a parental-control software system, an academic-performance policy that defines how academic performance of a student affects at least one parental-control setting enforced on a computing system accessible to a student.

In addition, computing device 202 may be programmed to receive, via an electronic communication from a school of the student, grade information that indicates the student's academic performance. Computing device 202 may also be programmed to apply the academic-performance policy by updating the parental-control setting commensurate with the student's academic performance. Computing device 202 may be further programmed to detect an attempt by the student to access a resource of the computing device and apply the updated parental-control setting to control the student's access to the resource of the computing device.

In some embodiments, as illustrated in FIG. 2, all of modules 102 may be stored and configured to run on a single computing device (e.g., computing device 202) within the computing system. In addition, all of parental-control-software database 124 may be stored and accessed on the computing device within the computing system. For example, all of modules 102 may be stored and configured to run on a computing device used by the student, and parental-control-software database 124 may be stored and accessed on the same computing device used by the student.

In other embodiments, although not illustrated in FIG. 2, one or more of modules 102 may be stored and configured to run on multiple computing devices. For example, policy module 104 and acquisition module 106 may be stored and configured to run on a computing device used by a parent of the student (e.g., on a parent's computer), and calibration module 108 and enforcement module 110 may be stored and configured to run on a different computing device used by the student (e.g., on the student's cellular phone). Similarly, parental-control-software database 124 may be stored on multiple computing devices. For example, academic-performance policy 130 may be established and stored on a computing device used by the student's parent (e.g., on the parent's computer), and parental-control settings 132 may be stored and configured to control access to resources on a computing device used by the student (e.g., on the student's cellular phone).

Computing device 202 generally represents any type or form of computing device capable of reading computer-executable instructions. Computing device 202 may also represent a computing device that is accessible to a student (e.g., a student's home computer). Examples of computing device 202 include, without limitation, laptops, desktops, servers, cellular phones, personal digital assistants (PDAs), multimedia players, embedded systems, video game consoles, combinations of one or more of the same, exemplary computing system 510 in FIG. 5, or any other suitable computing device.

Server 206 generally represents any type or form of computing device that is capable of providing grade information and database services to computing device 202 via network 204. Such database services may include collection and distribution of grade information that indicates a student's academic performance. Server 206 may also incorporate a storage controller and/or provide storage management services. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing device 202 and server 206.

FIG. 3 is a block diagram of an exemplary parental-control software system 300 for calibrating parental-control settings commensurate with a student's academic performance. In various embodiments, parental-control software system 300 may include a parental-control software system interface 302 displayed as a graphical user interface on computing device 202. Computing device 202 may display parental-control software system interface 302 on any suitable output device capable of displaying a visual output (e.g., a monitor). Computing device 202 may display parental-control software system interface 302 in a variety of shapes, sizes, and/or colors.

Parental-control software system interface 302 may be capable of receiving, from a parent of a student, information used to establish an academic-performance policy 130 that defines how the student's academic performance affects at least one parental-control setting enforced on computing device 202. For example, a parent of a student may enter information used by parental-control software system 300 to establish an academic-performance policy 130 that allows the student up to 3 hours of Internet access per day while the student maintains an "A" in math. Parental-control software system interface 302 may receive such information through any suitable input device that is capable of communicating with computing device 202 and entering information into parental-control software system interface 302, including a keyboard, a computer mouse, and/or a touch screen device. Examples of parental-control software system 300 include, without limitation, NORTON ONLINE FAMILY (also known as WATCHDOG), NORTON INTERNET SECURITY, NET NANNY, CYBERPATROL, SAFE EYES, WEBWATCHER, PC TATTLETALE, and/or any other suitable parental-control software systems.

Academic-performance policy 130 may include a logic-based rule that is used to determine whether to modify the parental-control setting commensurate with the student's academic performance. The logic-based rule may include one or more criteria for determining whether to modify the parental-control setting. For example, a logic-based rule within academic-performance policy 130 may include various criteria, such as scope of academic performance, subject, and/or grade threshold, against which parental-control software system 300 may compare the student's academic performance to determine whether to modify the parental-control setting that controls Internet access. In this example, the scope-of-academic-performance criterion may include various options for defining the scope of academic performance, such as grade point average ("GPA"), cumulative GPA, overall grade in a particular subject, average grade (whether overall or in a particular subject) throughout a period of time, average grade from two or more subjects, and/or grade on a particular test.

Although not illustrated in FIG. 3, the logic-based rule may, in some embodiments, include multiple instances of a single criterion, such as the grade-threshold criterion. For example, the logic-based rule may include a first grade threshold that allows the student up to 1 hour of Internet access per day while the student maintains a "C" in math, a second grade threshold that allows the student up to 2 hours of Internet access per day while the student maintains a "B" in math, and a third grade threshold that allows the student up to 3 hours of Internet access per day while the student maintains an "A" in math. The logic-based rule may also be used to determine whether to modify multiple parental-control settings commensurate with the student's academic performance. Additionally or alternatively, the academic-performance policy may include multiple logic-based rules that are, either individually or collectively, used to determine whether to modify multiple parental-control settings commensurate with the student's academic performance.

Figure 4:
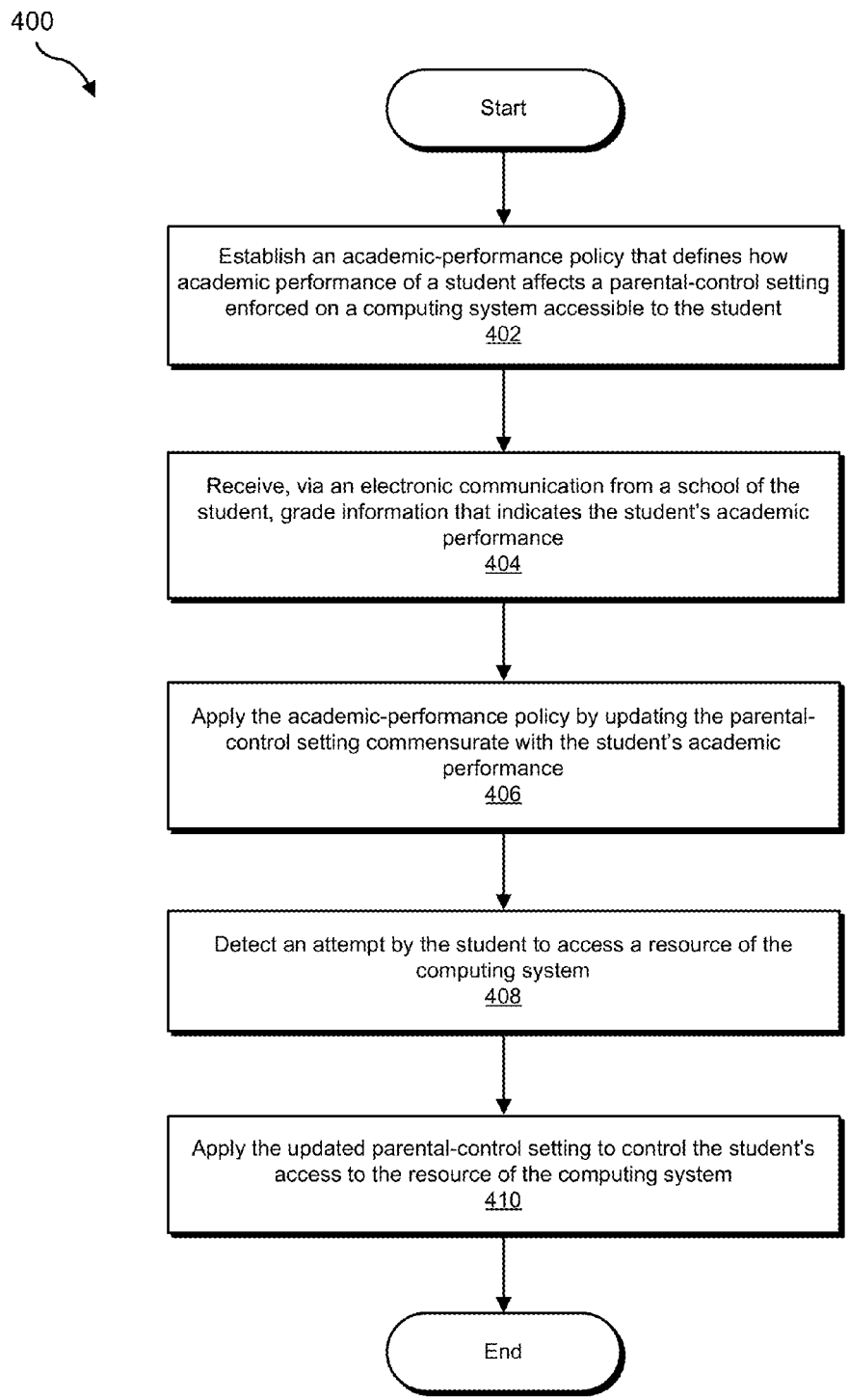
FIG. 4 is a flow diagram of an exemplary method for updating parental-control settings.

FIG. 4 is a flow diagram of an exemplary computer-implemented method 400 for updating parental-control settings. The steps shown in FIG. 4 may be performed by any suitable computer-executable code and/or computing system. In some embodiments, the steps shown in FIG. 4 may be performed by one or more of the components of system 100 in FIG. 1 and/or computing system 200 in FIG. 2. For example, at step 402, policy module 104 may establish, within parental-control software system 300, an academic-performance policy that defines how academic performance of a student affects at least one parental-control setting enforced on computing device 202.

Step 402 may be performed in a variety of ways. In certain embodiments, policy module 104 may receive, from a parent of a student, information used to establish the academic-performance policy. For example, a parent of a student may enter information into parental-control software system interface 302, and policy module 104 may receive the information. In this example, policy module 104 may then use the information to establish an academic-performance policy (e.g., academic-performance policy 130) that defines how the student's academic performance affects a parental-control setting that controls the student's Internet access on computing device 202. Academic-performance policy 130 may take into account the student's grades, classroom behavior, attendance, participation, progress, and/or any other suitable indicator of the student's academic performance.

Policy module 104 may receive the information used to establish academic-performance policy 130 in response to one or more user-input actions performed on any suitable input device (e.g., a computer mouse, a keyboard, or a touch screen device). For example, the parent may use a computer mouse in communication with computing device 202 to select the math option of the subject criterion within parental-control software system interface 302. The input device may establish communication with computing device 202 through any suitable means of communication, including conductive wiring, optical fibers, Ethernet cables, universal serial buses, and/or wireless radios.

The information used to establish academic-performance policy 130 may be entered into parental-control software system interface 302. In some embodiments, parental-control software system interface 302 may be a web portal that facilitates entering the information into parental-control software system 300. For example, the parent may enter the information into a web portal in order to establish academic-performance policy 130. In this example, although academic-performance policy 130 may be enforced on computing device 202, the parent may use a different computing device to access the web portal (or other interface) and enter the information used to establish academic-performance policy 130.

In additional embodiments, parental-control software system interface 302 may be a parental-control software system agent that facilitates entering the information into parental-control software system 300. For example, parental-control software system 300 may include a parental-control software system agent that enables a parent to enter the information on computing device 202. In another example, if parental-control software system 300 is distributed between a computing device of the parent and a computing device of the student, the parent may enter the information via a parental-control software system agent configured to facilitate entering the information on the parent's computing device, and the information may be used to establish an academic-performance policy enforced on the student's computing device.

In other embodiments, policy module 104 may import (from, e.g., another computing device, a software application, a computer-readable medium, or the Internet) information used to establish academic-performance policy 130. For example, parental-control software system 300 may be installed on computing device 202 by a computer-readable medium that includes standard information imported into parental-control software system 300. In this example, after the standard information has been imported into parental-control software system 300 from the computer-readable medium, policy module 104 may use the standard information to establish a default academic-performance policy that defines how the student's academic performance affects a parental-control setting that controls the student's Internet access on computing device 202. Although the exemplary parental-control setting described herein may control the student's Internet access on computing device 202, the parental-control setting implicated in the academic-performance policy may control the student's access to any resource of computing device 202 (e.g., the Internet, a particular webpage, a software application, a video game, an email account, an instant messaging client, a text messaging application, a phone application, a video application, an audio application, etc.).

Policy module 104 may store academic-performance policy 130 within parental-control-software database 124 on computing device 202. Policy module 104 may also store the parental-control setting implicated in academic-performance policy 130 within parental-control-software database 124 as part of parental-control settings 132. In addition, parental-control settings 132 may include one or more parental-control settings that are not implicated in academic-performance policy 130.

In some embodiments, academic-performance policy 130 may define a threshold level that the student's academic performance must reach for the student to be allowed access to a particular resource of computing system 202. For example, academic-performance policy 130 may indicate that the student must maintain a grade of "C" or above in math to be allowed Internet access on computing device 202. Computing device 202 may represent the student's home computer, the student's cellular phone, the student's video game console, or any other computing device that is accessible to the student.

Academic-performance policy 130 may also define how the student's academic performance affects an amount of time that the student is allowed to access the resource of computing device 202. For example, academic-performance policy 130 may indicate that the student must maintain an "A" in math to be allowed up to 3 hours of Internet access per day, a "B" in math to be allowed up to 2 hours of Internet access per day, or a "C" in math to be allowed up to 1 hour of Internet access per day. As such, academic-performance policy 130 may include one or more threshold levels that correspond to different amounts of time that the resource may be accessed by the student, depending on the student's academic performance.

In addition, academic-performance policy 130 may define a scope of academic performance that indicates at least one characteristic of the student's academic performance to be compared against a threshold level identified in academic-performance policy 130. In some examples, the parent may define the scope of academic performance as the student's GPA during a particular term of a school year or the student's cumulative GPA during one or more school years. In other examples, the parent may define the scope of academic performance as the student's overall grade in a particular subject or the student's average grade (whether GPA or average grade in a particular subject) throughout a particular period of time. In additional examples, the parent may define the scope of academic performance as the student's average grade from two or more subjects or the student's grade on a particular test or assignment.

At step 404 in FIG. 4, acquisition module 106 may receive, via an electronic communication from a school of the student, grade information that indicates the student's academic performance. For example, acquisition module 106 may receive, on computing device 202, grade information indicating, among other things, that the student is currently maintaining an "A" in math. The grade information may indicate the student's academic performance based on the student's grades, classroom behavior, attendance, participation, progress, and/or any other indicator of the student's academic performance.

Step 404 may be performed in a variety of ways. In certain embodiments, a student's school may send an electronic communication directly to computing device 202. For example, a school may broadcast, to computing systems accessible to various students of the school, grade information that indicates the academic performance of the students. As such, the electronic communication may also provide grade information for other students that are unable to access computing device 202. In another example, school may send, directly to computing device 202, grade information indicating only the student's academic performance.

In some embodiments, the students' school may provide a website that publishes the grade information indicating the student's academic performance. The electronic communication from the student's school may be this website that publishes the grade information. For example, the student's school may partner with a third-party company, such as EAGLE SOFTWARE or PEARSON EDUCATION, to maintain a website that publishes the grade information for the student's school. In another example, the student's school may, individually or as part of a school district, maintain a website that publishes the grade information.

In at least one embodiment, acquisition module 106 may retrieve the grade information from the website in order to enable the parental-control software system to analyze the student's academic performance. For example, the grade information published by the website may be stored within grade-information database 122 on server 206, and acquisition module 106 may access grade-information database 122 to retrieve the grade information. The grade information may be configured in a format that is standardized for use between the website and the parental-control software system. In other words, the website may distribute the grade information to the parental-control software system in a format that the parental-control software system is capable of reading and understanding.

In additional embodiments, acquisition module 106 may implement a screen-scraping technique to retrieve grade information displayed as a visual representation on at least one component of computing device 202. For example, computing device 202 may access the website in order to display the grade information as a visual representation on a monitor of computing device 202. In this example, acquisition module 106 may then implement a screen-scraping technique that enables acquisition module 106 to retrieve the grade information displayed as a visual representation on the monitor of computing device 202.

Acquisition module 106 may also determine, prior to retrieving the grade information from the website, that the parental-control software system has yet to receive the most up-to-date grade information available on the website. For example, prior to retrieving the grade information from the website, acquisition module 106 may query the website to determine that the website contains grade information that has not been received by the parental-control software system. In another example, prior to retrieving the grade information from the website, acquisition module 106 may receive an electronic communication indicating that the website contains grade information that has not been received by the parent-control software system. Acquisition module 106 may then retrieve the grade information from the website in response to learning that the parental-control software system has yet to receive the most up-to-date grade information.

In certain embodiments, acquisition module 106 may be configured to retrieve the grade information periodically (e.g., on a predetermined schedule). For example, acquisition module 106 may be configured to retrieve the grade information from the website at 4:00 pm every weekday. In this example, the predetermined schedule of retrieving the grade information at 4:00 pm every weekday may be defined by the parent (upon, e.g., entering the information to establish academic-performance policy 130) or set as a default by the parental-control software system.

Additionally or alternatively, acquisition module 106 may be configured to periodically determine, on a predetermined schedule, whether the parental-control software system has yet to receive the most up-to-date grade information available on the website. Then, upon determining that the parental-control software system has yet to receive the most up-to-date grade information available on the website, acquisition module 106 may retrieve the most up-to-date grade information from the website.

At step 406 in FIG. 4, calibration module 108 may apply academic-performance policy 130 on computing device 202 by updating the parental-control setting commensurate with the student's academic performance. Calibration module 108 may automatically update the parental-control setting when the parental-control software system receives the grade information from the student's school. For example, after acquisition module 106 receives the grade information indicating that the student is currently maintaining an "A" in math, calibration module 108 may automatically update the parental-control setting to allow the student up to 3 hours of Internet access per day.

More specifically, upon reception of the grade information, calibration module 108 may immediately analyze the student's academic performance in order to update the parental-control setting in real-time. The term "real-time," as used herein, may refer to the manner in which a parental-control setting is updated or calibrated immediately and automatically by a computing device upon receiving grade information that indicates academic performance of a student.

Calibration module 108 may update the parental-control setting in real-time by automatically beginning to analyze the student's academic performance immediately after reception of the grade information and then automatically updating the parental-control setting commensurate with the student's academic performance immediately after finishing this analysis. The term "immediately," as used herein, may refer to a very small amount of time (e.g., a few minutes, a few seconds, less than one second) following a particular event (e.g., reception of grade information or completion of an analysis).

In addition, the term "automatically," as used herein, may refer to the manner in which a computing device may update or calibrate a parental-control setting without waiting for or requiring any input from a user (e.g., a parent) or other software module after reception of grade information. For example, calibration module 108 may update the parental-control setting in real-time by immediately beginning to analyze the student's academic performance without waiting for or requiring any input from the parent after reception of the grade information. In this example, calibration module 108 may then immediately update the parental-control setting commensurate with the student's academic performance without waiting for or requiring any input from the parent after finishing the analysis.

Calibration module 108 may analyze the student's academic performance by comparing the student's academic performance with academic-performance policy 130. Calibration module 108 may then determine, based on this comparison, whether academic-performance policy 130 requires the parental-control setting to be immediately modified due to the student's academic performance. For example, calibration module 108 may compare the student's academic performance with academic-performance policy 130 and then determine that, since the student is currently maintaining an "A" in math, academic-performance policy 130 requires the parental-control setting to be immediately modified in order to allow the student up to 3 hours of Internet access per day.

At step 408 in FIG. 4, enforcement module 110 may detect an attempt by the student to access the resource of computing device 202. For example, enforcement module 110 may determine that the student has opened an Internet browser in an attempt to access the Internet on computing device 202. Enforcement module 110 may detect the attempt to access the resource in response to one or more user-input actions performed by the student on any suitable input device (e.g., a computer mouse, a keyboard, or a touchscreen device). Examples of such resources include, without limitation, the Internet, a webpage, a software application, a video game, an email account, an instant messaging client, a text messaging application, a phone application, a video application, or any other suitable resources of a computing device.

At step 410 in FIG. 4, enforcement module 110 may apply the updated parental-control setting to control the student's access to the resource of computing device 202. In other words, enforcement module 110 may analyze whether the updated parental-control setting is currently configured to allow the student to access the Internet or to block the student from accessing the Internet. For example, if the student has already accessed the Internet for 3 hours on a particular day, enforcement module 110 may determine that the student is no longer allowed to access the Internet because the updated parental-control setting limits the student's Internet access to 3 hours per day. In this example, enforcement module 110 may then block the student from accessing the Internet based on the updated parental-control setting.

Upon completion of step 410 in FIG. 4, exemplary method 400 may terminate. However, although not illustrated in FIG. 4, the exemplary method may include one or more additional steps. In various embodiments, enforcement module 110 may provide an electronic notification configured to inform the student that the parental-control setting has been automatically updated commensurate with the student's academic performance. For example, enforcement module 110 may provide an electronic notification that informs the student that the parental-control setting has been modified to allow the student up to 3 hours of Internet access due to the student's academic performance.

The electronic notification may indicate any modifications made to the parental-control setting. For example, the electronic notification may indicate that, although the parental-control setting may have been previously configured to allow the student up to 2 hours of Internet access per day, the parental-control setting has been modified to allow the student up to 3 hours of Internet access per day. The electronic notification may also explain why the parental-control setting was modified and how the parental-control setting may be restored to its previous configuration. For example, the electronic notification may explain that the parental-control setting was modified as a result of the student's grade in math and that the parental-control setting may be restored to its previous configuration if the student's grade in math drops from an "A" to a "B".

Figure 5:
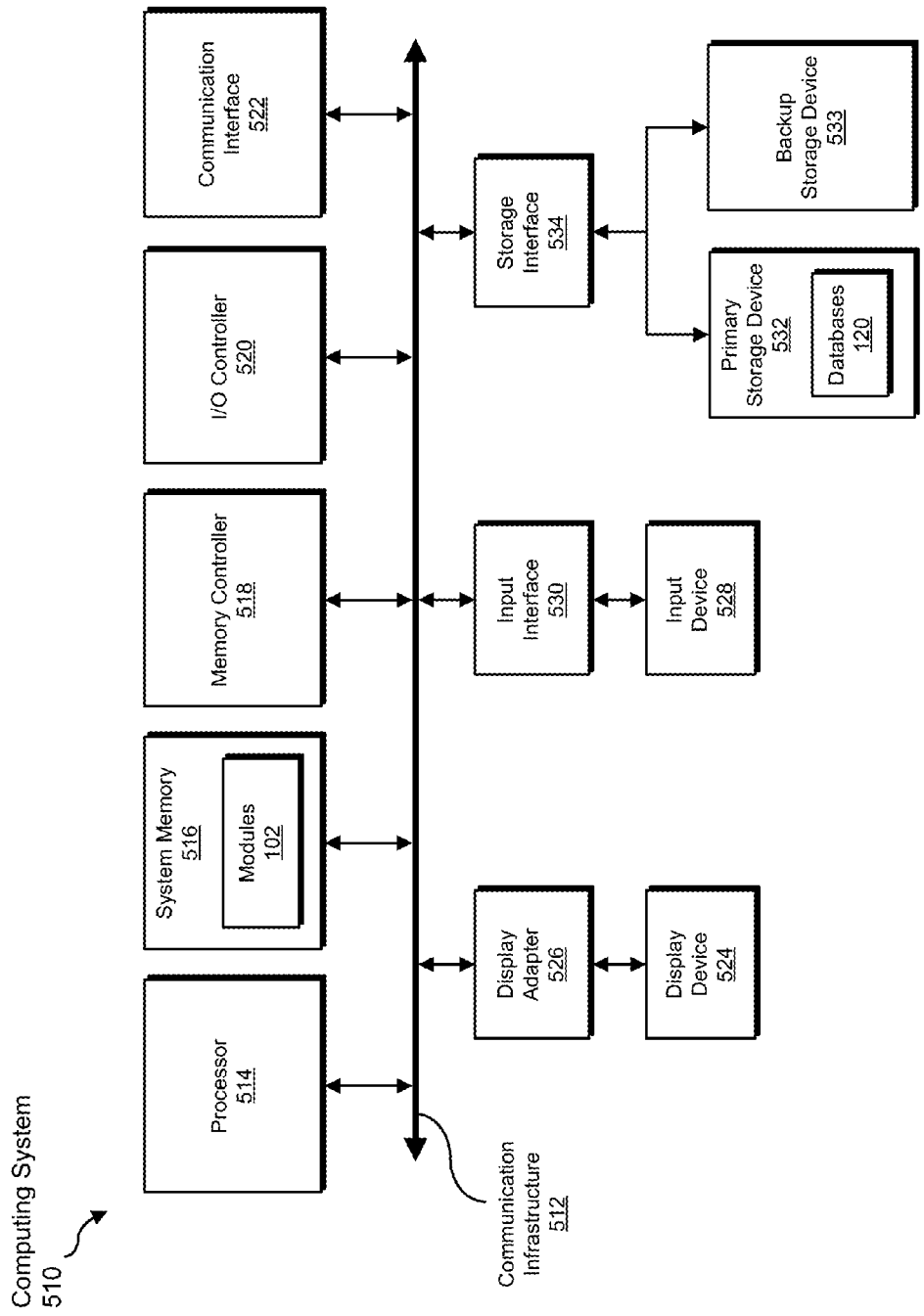
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the establishing, receiving, applying, updating, detecting, defining, retrieving, implementing, querying, analyzing, determining, blocking, and providing steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the steps or features described and/or illustrated herein, such as establishing, receiving, applying, updating, detecting, defining, retrieving, implementing, querying, analyzing, determining, blocking, and providing.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the establishing, receiving, applying, updating, detecting, defining, retrieving, implementing, querying, analyzing, determining, blocking, and providing steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the establishing, receiving, applying, updating, detecting, defining, retrieving, implementing, querying, analyzing, determining, blocking, and providing steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the establishing, receiving, applying, updating, detecting, defining, retrieving, implementing, querying, analyzing, determining, blocking, and providing steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510. In one example, databases 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the establishing, receiving, applying, updating, detecting, defining, retrieving, implementing, querying, analyzing, determining, blocking, and providing steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
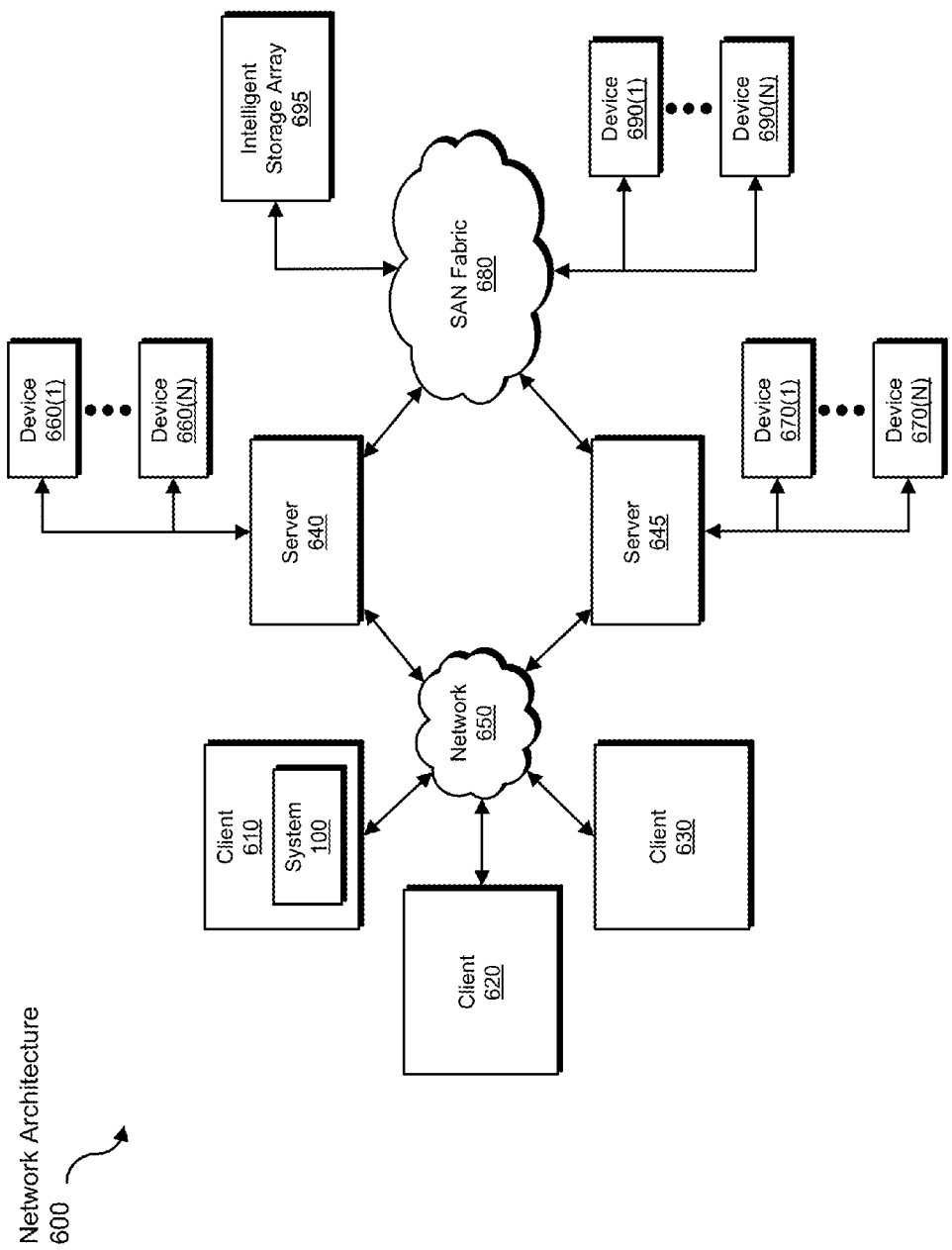
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the establishing, receiving, applying, updating, detecting, defining, retrieving, implementing, querying, analyzing, determining, blocking, and providing steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for updating parental-control settings.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, calibration module 108 in FIG. 1 may transform a property or characteristic of a parental-control setting that controls access to a resource of computing device 202 in FIG. 2.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A method for updating parental-control settings, at least a portion of the method being performed by a computing device comprising at least one processor, the method comprising:
   establishing, within a parental-control software system, an academic-performance policy that defines how academic performance of a student affects at least one parental-control setting enforced on a computing system accessible to the student;
   receiving, via an electronic communication from a school of the student, grade information that indicates the student's academic performance;
   in response to receiving the grade information and without waiting for or requiring input from a parent of the student after reception of the grade information, automatically analyzing the student's academic performance by comparing the student's academic performance with the academic-performance policy;
   determining, based on the comparison of the student's academic performance with the academic-performance policy, that the academic-performance policy indicates that the parental-control setting is to be modified due to the student's academic performance;
   in response to determining that the parental-control setting is to be modified due to the student's academic performance, automatically applying the academic-performance policy by updating the parental-control setting commensurate with the student's academic performance, the parental-control setting being automatically updated by the parental-control software system when the parental-control software system receives the grade information from the school of the student;
   detecting an attempt by the student to access a resource of the computing system;
   applying the updated parental-control setting to control the student's access to the resource of the computing system.

2. The method of claim 1, wherein:
   the student's academic performance is analyzed immediately upon receiving the grade information;
   the parental-control setting is modified immediately upon determining that the academic-performance policy indicates that the parental-control setting is to be modified due to the student's academic performance.

3. The method of claim 1, wherein:
   comparing the student's academic performance with the academic-performance policy comprises determining that the student's academic performance has improved;
   determining that the academic-performance policy indicates that the parental-control setting is to be modified due to the student's academic performance comprises determining that the parental-control setting is to be modified to allow the student increased access to the resource of the computing system;
   applying the academic-performance policy comprises allowing the student increased accesses to the resource of the computing system.

4. The method of claim 1, wherein receiving the grade information that indicates the student's academic performance comprises retrieving the grade information from a website that publishes the grade information from the school of the student.

5. The method of claim 4, wherein retrieving the grade information from the website comprises
implementing a screen-scraping technique to retrieve grade information displayed as a visual representation on at least one component of the computing system.

6. The method of claim 4, further comprising, prior to retrieving the grade information from the website, at least one of:
querying the website to determine that the website contains grade information that has not been retrieved by the parental-control software system;
receiving an electronic communication indicating that the website contains grade information that has not been retrieved by the parental-control software system.

7. The method of claim 1, wherein applying the updated parental-control setting comprises determining that the student has already reached a limit for accessing the resource of the computing system and that the student is no longer allowed to access the resource of the computing system.

8. The method of claim 1, wherein applying the updated parental-control setting to control the student's access to the resource of the computing system comprises:
determining that the updated parental-control setting indicates that the student is not allowed to access the resource of the computing system;
blocking the student from accessing the resource of the computing system based on the updated parental-control setting.

9. The method of claim 1, further comprising providing an electronic notification configured to inform the student that the parental-control setting has been automatically updated commensurate with the student's academic performance.

10. The method of claim 1, wherein the resource of the computing system comprises at least one of:
the Internet;
a webpage;
a software application;
a video game;
an email account;
an instant messaging client;
a text messaging application;
a phone application;
a video application.

11. A system for calibrating parental-control settings commensurate with a student's academic performance, the system comprising:
at least one processor;
a policy module programmed to direct the processor to:
establish, within a parental-control software system, an academic-performance policy that defines how academic performance of a student affects at least one parental-control setting enforced on a computing system accessible to the student;
an acquisition module programmed to direct the processor to:
receive, via an electronic communication from a school of the student, grade information that indicates the student's academic performance;
a calibration module programmed to direct the processor to:
in response to receiving the grade information and without waiting for or requiring input from a parent of the student after reception of the grade information, automatically analyze the student's academic performance by comparing the student's academic performance with the academic-performance policy;
determine, based on the comparison of the student's academic performance with the academic-performance policy, that the academic-performance policy indicates that the parental-control setting is to be modified due to the student's academic performance;
in response to determining that the parental-control setting is to be modified due to the student's academic performance, automatically apply the academic-performance policy by updating the parental-control setting commensurate with the student's academic performance, the parental-control setting being automatically updated by the parental-control software system when the parental-control software system receives the grade information from the school of the student;
an enforcement module programmed to direct the processor to:
detect an attempt by the student to access a resource of the computing system;
apply the updated parental-control setting to control the student's access to the resource of the computing system.

12. The system of claim 11, wherein the policy module is programmed to direct the processor to define a threshold level that the student's academic performance must reach for the student to be allowed access to the resource of the computing system.

13. The system of claim 11, wherein the policy module is programmed to direct the processor to define how the student's academic performance affects an amount of time that the student is allowed to access the resource of the computing system.

14. The system of claim 11, wherein the acquisition module is programmed to direct the processor to retrieve the grade information from a website that publishes the grade information from the school of the student.

15. The system of claim 14, wherein the acquisition module is programmed to direct the processor to:
retrieve grade information configured in a format that is standardized for use between the website and the parental-control software system.

16. The system of claim 14, wherein the acquisition module is programmed to direct the processor to at least one of:
prior to retrieving the grade information from the website, query the website to determine that the website contains grade information that has not been retrieved by the parental-control software system;
prior to retrieving the grade information from the website, receive an electronic communication indicating that the website contains grade information that has not been retrieved by the parental-control software system.

17. The system of claim 11, wherein the calibration module is programmed to direct the processor to:
compare the student's academic performance with the academic-performance policy by determining that the student's academic performance has improved;
determine that the academic-performance policy indicates that the parental-control setting is to be modified due to the student's academic performance by determining that the parental-control setting is to be modified to allow the student increased access to the resource of the computing system.

18. The system of claim 11, wherein the enforcement module is programmed to direct the processor to:
determine that the updated parental-control setting indicates that the student is not allowed to access the resource of the computing system;

block the student from accessing the resource of the computing system based on the updated parental-control setting.

19. The system of claim 11, wherein the enforcement module is programmed to direct the processor to provide an electronic notification configured to inform the student that the parental-control setting has been automatically updated commensurate with the student's academic performance.

20. A non-transitory computer-readable-storage medium comprising one or more computer-executable instructions that, when executed by at least one processor of a computing device, cause the computing device to:
- establish, within a parental-control software system, an academic-performance policy that defines how academic performance of a student affects at least one parental-control setting enforced on a computing system accessible to the student;
- receive, via an electronic communication from a school of the student, grade information that indicates the student's academic performance;
- apply the academic-performance policy by updating the parental-control setting commensurate with the student's academic performance, the parental-control setting being automatically updated by the parental-control software system when the parental-control software system receives the grade information from the school of the student;
- detect an attempt by the student to access a resource of the computing system;
- in response to receiving the grade information and without waiting for or requiring input from a parent of the student after reception of the grade information, automatically analyze the student's academic performance by comparing the student's academic performance with the academic-performance policy;
- determine, based on the comparison of the student's academic performance with the academic-performance policy, that the academic-performance policy indicates that the parental-control setting is to be modified due to the student's academic performance;
- in response to determining that the parental-control setting is to be modified due to the student's academic performance, automatically apply the updated parental-control setting to control the student's access to the resource of the computing system.

* * * * *